(12) United States Patent  
Iwasaki

(10) Patent No.: US 7,372,580 B2  
(45) Date of Patent: May 13, 2008

(54) THREE-DIMENSIONAL SHAPE DETECTING DEVICE, THREE-DIMENSIONAL SHAPE DETECTING SYSTEM, AND THREE-DIMENSIONAL SHAPE DETECTING PROGRAM

(75) Inventor: Takeo Iwasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 233 days.

(21) Appl. No.: 11/385,774

(22) Filed: Mar. 22, 2006

(65) Prior Publication Data

US 2006/0158661 A1 Jul. 20, 2006

Related U.S. Application Data

(63) Continuation-in-part of application No. PCT/JP2004/013786, filed on Sep. 22, 2004.

(30) Foreign Application Priority Data

Sep. 25, 2003 (JP) ............................. 2003-332647

(51) Int. Cl.  
*G01B 11/24* (2006.01)

(52) U.S. Cl. .................. 356/604; 356/601; 356/603

(58) Field of Classification Search ............ 355/18–77; 356/600–613; 359/205  
See application file for complete search history.

(56) References Cited

U.S. PATENT DOCUMENTS

| 4,657,394 | A | * | 4/1987 | Halioua ..................... 356/604 |
| 4,846,577 | A | * | 7/1989 | Grindon ..................... 356/610 |
| 5,636,025 | A | * | 6/1997 | Bieman et al. ............. 356/619 |
| 5,646,733 | A | * | 7/1997 | Bieman ..................... 356/604 |
| 5,668,631 | A | | 9/1997 | Norita et al. |
| 5,838,428 | A | * | 11/1998 | Pipitone et al. ............ 356/3.09 |
| 5,986,745 | A | * | 11/1999 | Hermary et al. ........... 356/3.03 |
| 6,449,004 | B1 | | 9/2002 | Okisu et al. |
| 6,750,975 | B2 | * | 6/2004 | Takeda et al. .............. 356/604 |
| 6,940,664 | B1 | | 9/2005 | Pilu |
| 7,061,628 | B2 | * | 6/2006 | Franke et al. .............. 356/604 |
| 2002/0113946 | A1 | | 8/2002 | Kitaguchi et al. |

FOREIGN PATENT DOCUMENTS

| JP | A 6-274788 | 9/1994 |
| JP | A 9-289611 | 11/1997 |
| JP | A 2001-292312 | 10/2001 |
| JP | B2 3282331 | 3/2002 |
| JP | A 2003-504947 | 2/2003 |
| JP | A 2003-78725 | 3/2003 |
| JP | A 2003-216933 | 7/2003 |

* cited by examiner

*Primary Examiner*—Layla G. Lauchman  
*Assistant Examiner*—Jarreas Underwood  
(74) *Attorney, Agent, or Firm*—Oliff & Berridge, PLC

(57) ABSTRACT

In a three-dimensional shape detecting system comprising a three-dimensional shape detecting device and an external calculating device, the three-dimensional shape detecting device includes: projection means which projects pattern light onto a subject; image data obtaining means which captures a pattern light projection image of the subject and thereby obtains image data of the pattern light projection image while capturing a pattern light non-projection image of the subject and thereby obtaining image data of the pattern light non-projection image; pattern light position extraction means which extracts a position of the pattern light projected on the subject based on the obtained image data; and three-dimensional shape calculation means which figures out three-dimensional shape data of the subject based on the position of the pattern light extracted by the pattern light position extraction means.

13 Claims, 11 Drawing Sheets

FIG. 1
(a)
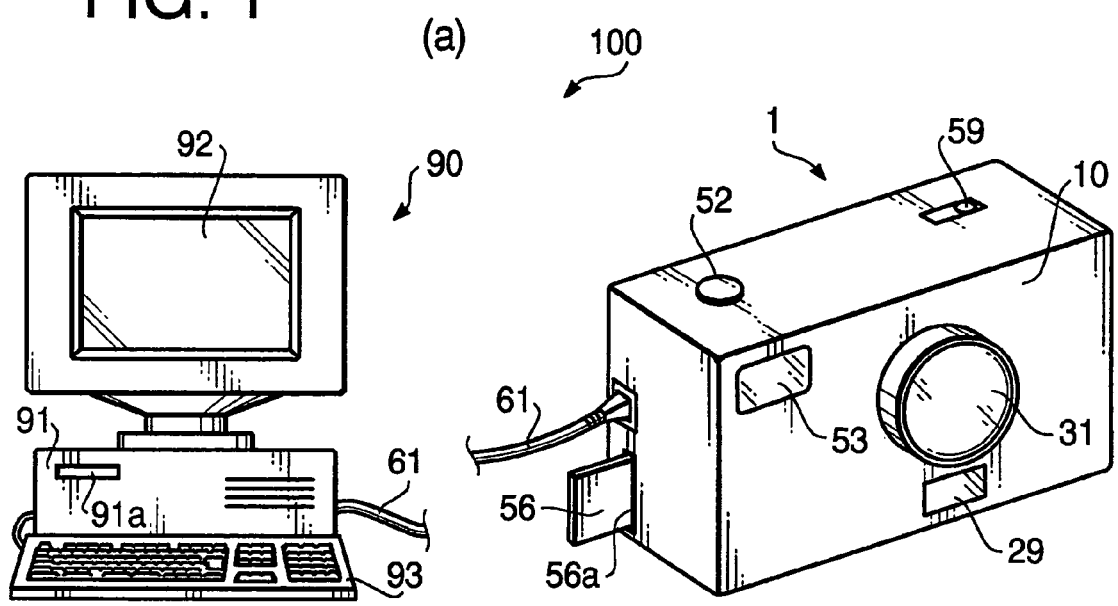
(b)
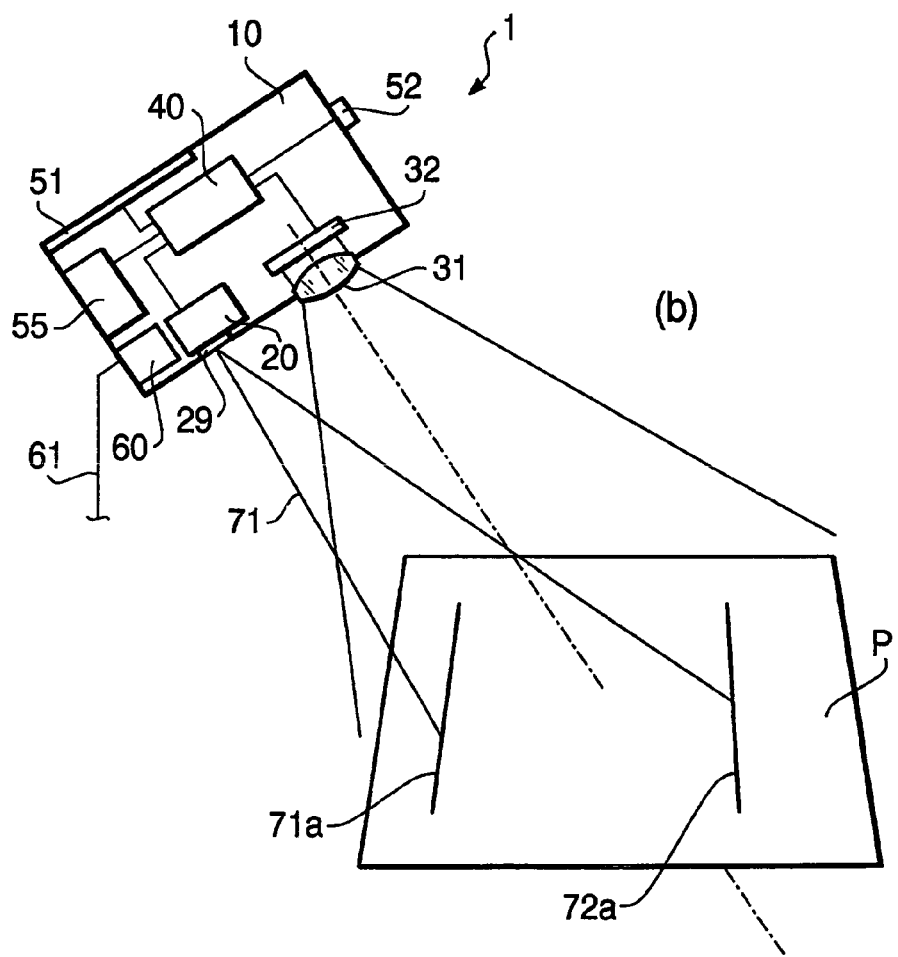

FIG. 3
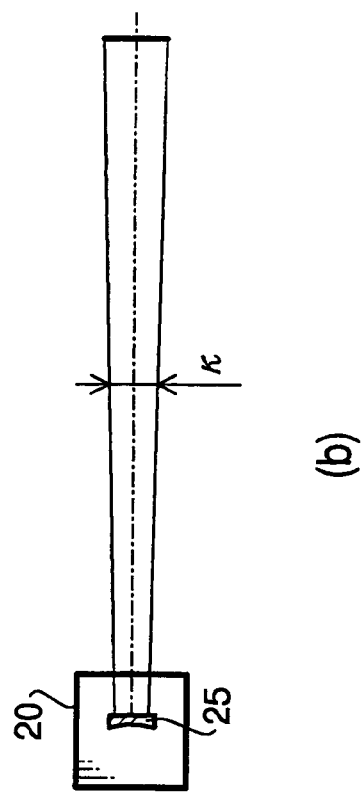
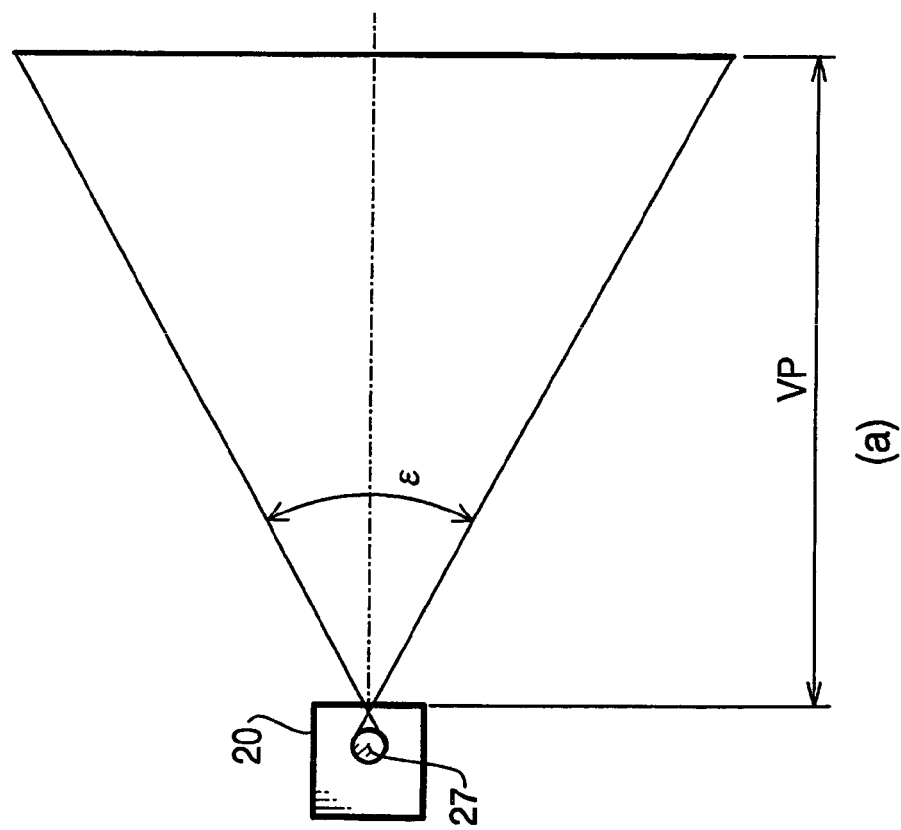

FIG. 7
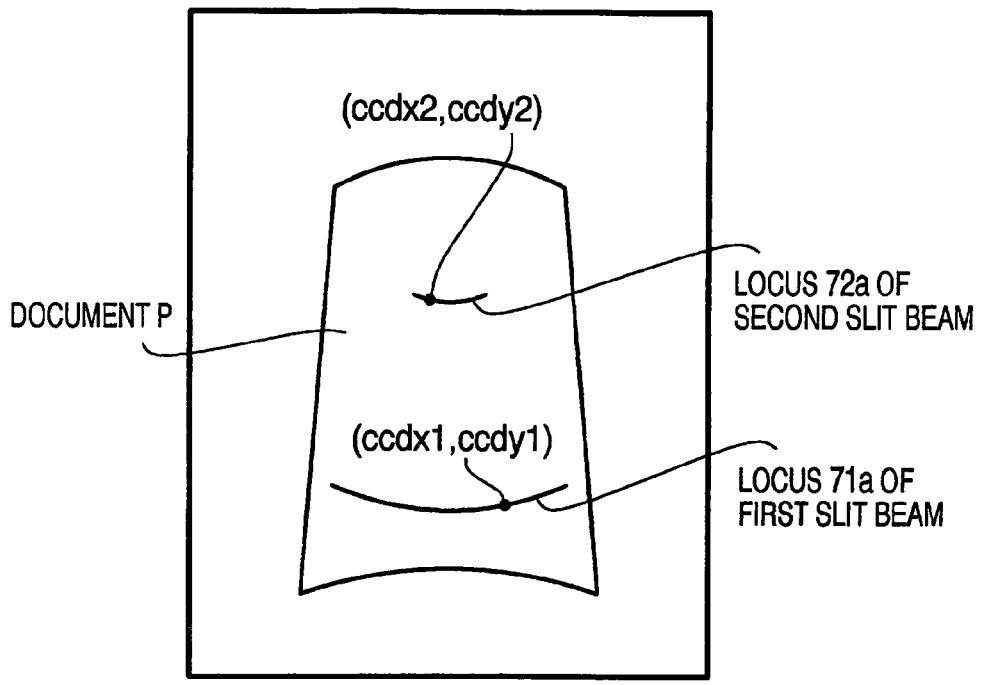
(a)
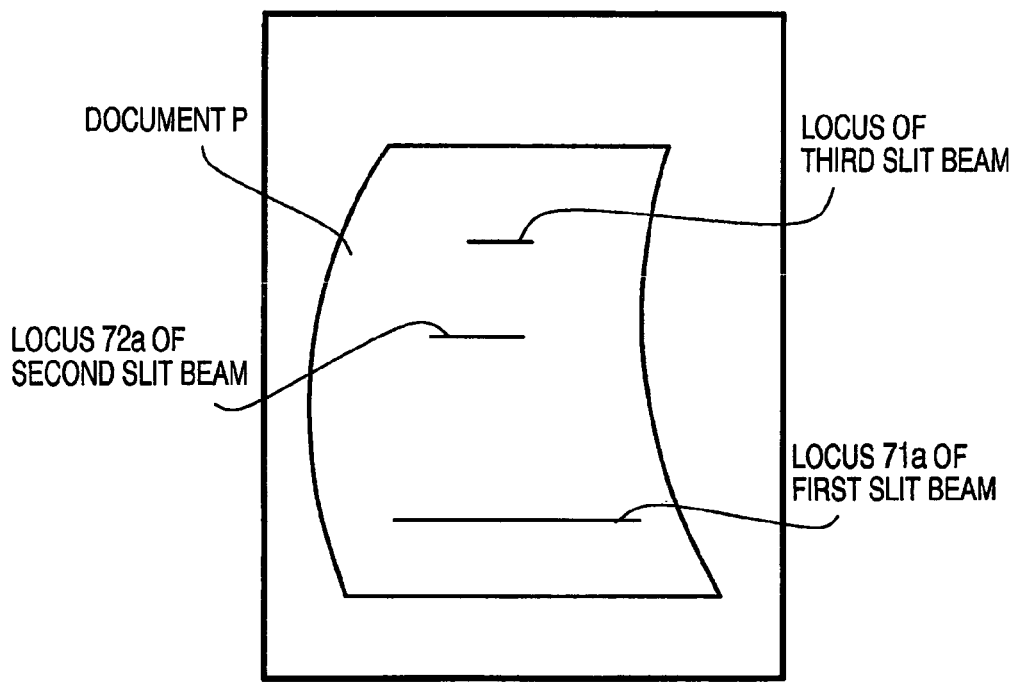
(b)

FIG. 8
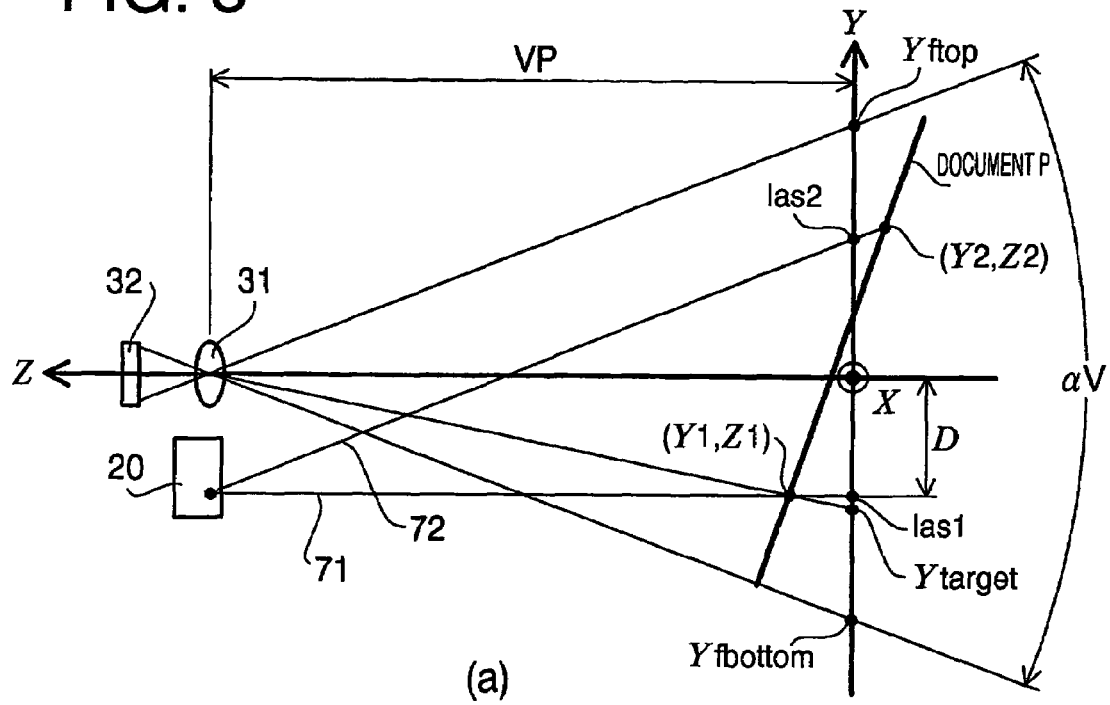
(a)
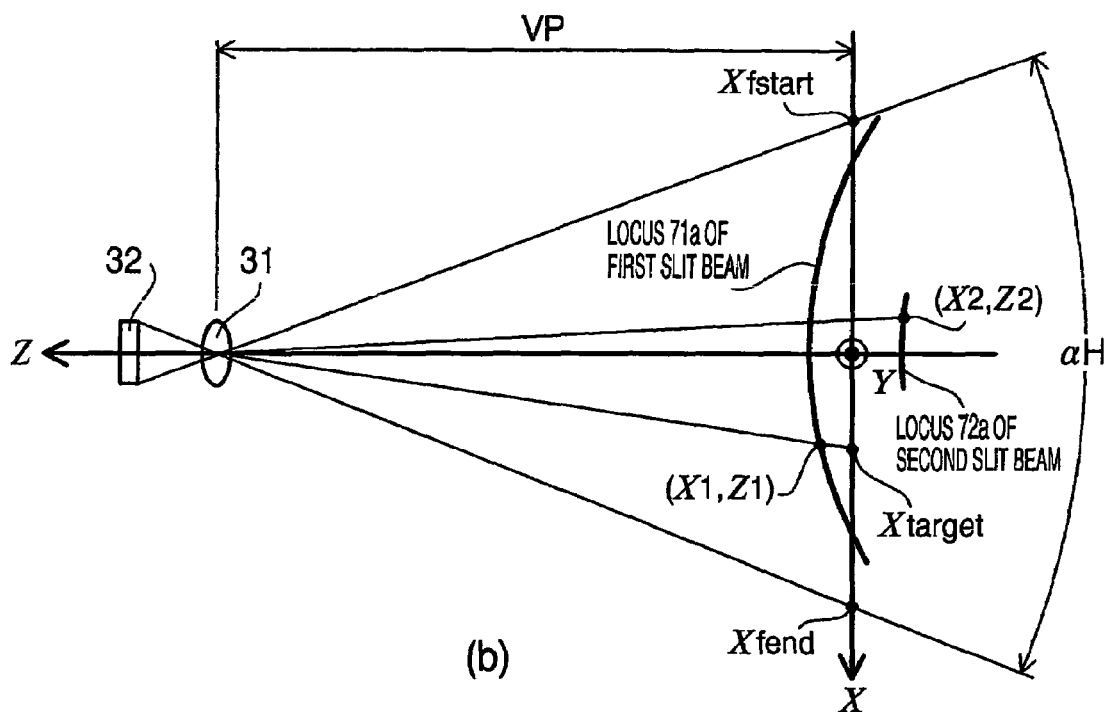
(b)

FIG. 9
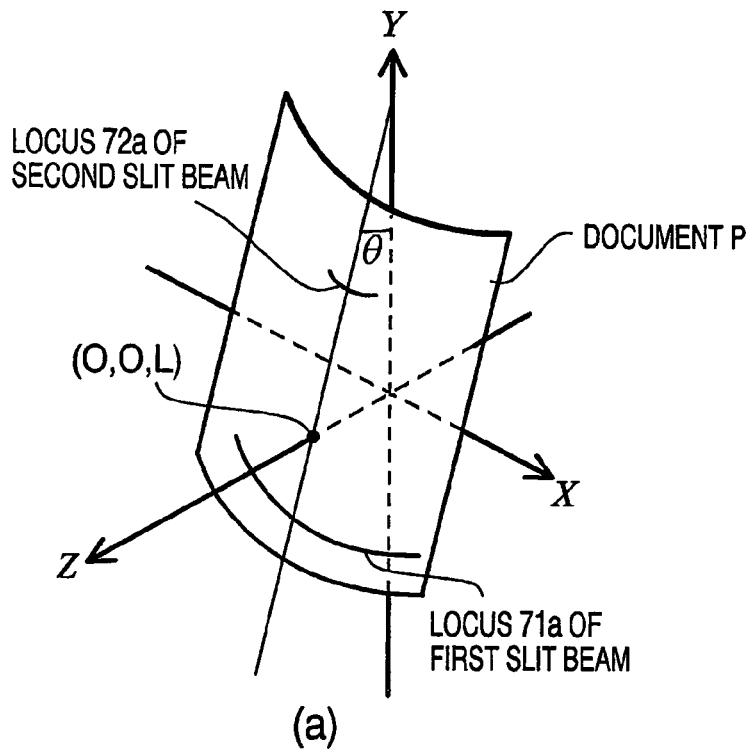
(a)
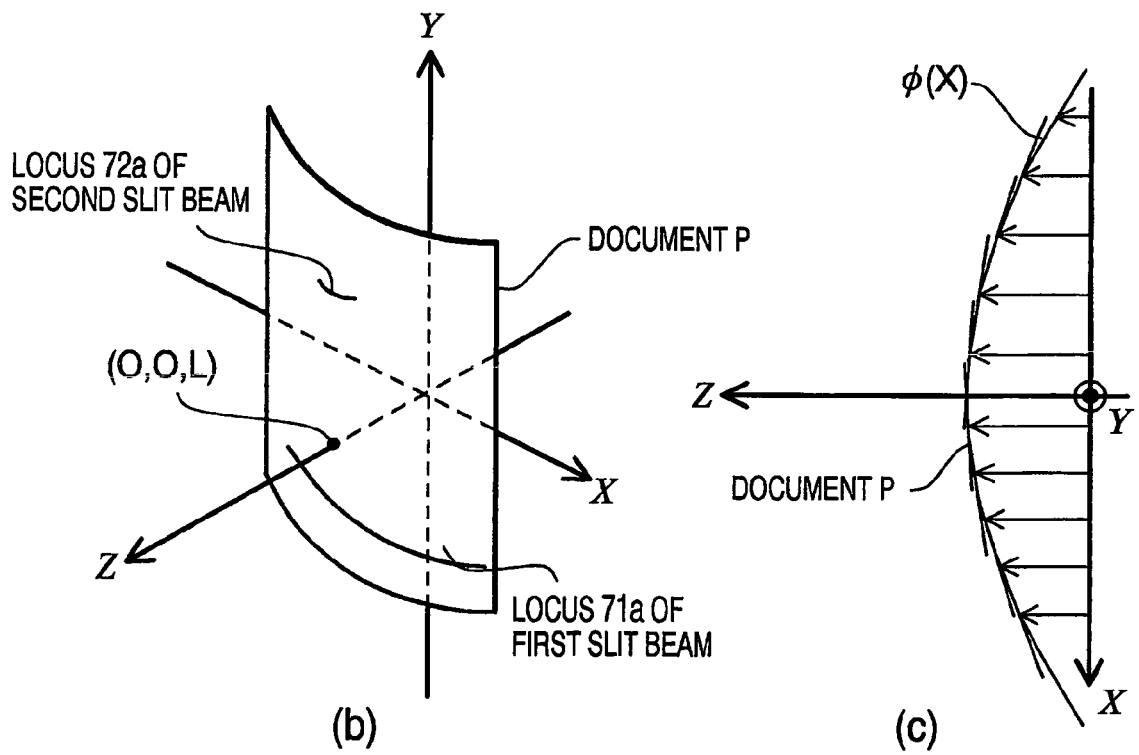
(b)  (c)

THREE-DIMENSIONAL SHAPE DETECTING DEVICE, THREE-DIMENSIONAL SHAPE DETECTING SYSTEM, AND THREE-DIMENSIONAL SHAPE DETECTING PROGRAM

This is a Continuation-in-Part of application Ser. No. PCT/JP2004/013786 filed Sep. 22, 2004, which claims the benefit of Japanese Patent Application No. 2003-332647 filed Sep. 25, 2003. The disclosure of the prior applications is hereby incorporated by reference herein in its entirety.

TECHNICAL FIELD

The present invention relates to a three-dimensional shape detecting device, a three-dimensional shape detecting system and a three-dimensional shape detecting program for detecting the three-dimensional shape of a subject by use of an optical beam.

BACKGROUND OF THE INVENTION

An image capturing device, having an image correcting function of correcting a captured image (an image of a subject such as a white board, a book, etc. captured by the device) as if the subject were shot from the front even when the subject is shot from a direction oblique to the front of the subject, is well known today. Such an image capturing device is equipped with a correction means which corrects the captured image as if the subject were shot from the front by detecting the three-dimensional shape of the subject based on the captured image of the subject. A portable digital camera provided with such a correction means has been disclosed in, for example, FIG. 1, etc. of Japanese Patent Provisional Publication No.HEI09-289611 (hereinafter referred to as a "document No. 1").

DISCLOSURE OF THE INVENTION

However, when the above image correction is made by a portable digital camera comprising the aforementioned correction means, such a portable device is necessitated to be inferior in calculating power to stationary devices due to strict restrictions on power consumption and outer shape of the device. Therefore, such a portable device has a problem of being incapable of high-speed calculation processes, or being incapable of employing low-priced components for the calculation processes.

The present invention has been made in consideration of the above problems. It is therefore the primary object of the present invention to provide a three-dimensional shape detecting device, a three-dimensional shape detecting system and a three-dimensional shape detecting program capable of realizing efficient storing of data necessary for the calculations for correcting a captured image (in which the subject is shot from an oblique direction) into a plane image (in which the subject is observed from a direction substantially orthogonal to a prescribed surface of the subject), while also being implementable by relatively low-priced calculating components.

In order to achieve the above object, an aspect of the present invention provides a three-dimensional shape detecting system comprising a three-dimensional shape detecting device and an external calculating device. The three-dimensional shape detecting device includes: projection means which projects pattern light onto a subject; image data obtaining means which captures a pattern light projection image of the subject on which the pattern light is projected by the projection means and thereby obtains image data of the pattern light projection image, while capturing a pattern light non-projection image of the subject on which the pattern light is not projected and thereby obtaining image data of the pattern light non-projection image; pattern light position extraction means which extracts a position of the pattern light projected on the subject based on the obtained image data; and three-dimensional shape calculation means which figures out three-dimensional shape data of the subject based on the position of the pattern light extracted by the pattern light position extraction means. The external calculating device includes image correction means which corrects the pattern light non-projection image into a plane image in which the subject is observed from a direction substantially orthogonal to a prescribed surface of the subject based on the image data of the pattern light non-projection image and the three-dimensional shape data obtained by the three-dimensional shape detecting device.

With the above configuration, the three-dimensional shape detecting device is relieved of the need of storing the image data of the pattern light projection image for the calculation of the plane image carried out by the external calculating device. Therefore, storage capacity can be saved in the three-dimensional shape detecting device compared to cases where both the image data of the pattern light projection image and the image data of the pattern light non-projection image are stored. Since relatively low-load calculations are executed by the three-dimensional shape detecting device and a relatively high-load process is executed by the external calculating device, the total performance of the three-dimensional shape detecting system can be enhanced by implementing the external calculating device by a high-performance device, for example.

Since the data supplied from the three-dimensional shape detecting device to the external calculating device are the image data of the pattern light non-projection image and the three-dimensional shape data, the data size is reduced considerably compared to cases where both the image data of the pattern light non-projection image and the image data of the pattern light projection image are supplied to the external calculating device. Therefore, the amount of data necessary when image data is supplied from the three-dimensional shape detecting device to the external calculating device can be reduced, and in cases where image data is transferred by data communication between the three-dimensional shape detecting device and the external calculating device, for example, reduction of communication time can be achieved.

In order to achieve the above object, another aspect of the present invention provides a three-dimensional shape detecting device which is used in a three-dimensional shape detecting system, comprising: projection means which projects pattern light onto a subject; and image data obtaining means which captures a pattern light projection image of the subject on which the pattern light is projected by the projection means and thereby obtains image data of the pattern light projection image, while capturing a pattern light non-projection image of the subject on which the pattern light is not projected and thereby obtaining image data of the pattern light non-projection image. Further, the three-dimensional shape detecting device comprises: pattern light position extraction means which extracts a position of the pattern light projected on the subject based on the obtained image data; and three-dimensional shape calculation means which figures out three-dimensional shape data of the subject based on the position of the pattern light extracted by the pattern light position extraction means. The image data of the pattern light non-projection image obtained by the image data obtaining means and the three-dimensional shape data figured out by the three-dimensional shape calculation means are used by an external calculating device for correcting the pattern light non-projection image into a plane image in which the subject is observed from a direction substantially orthogonal to a prescribed surface of the subject based on the image data of the pattern light non-projection image and the three-dimensional shape data.

With the above configuration, the three-dimensional shape detecting device is relieved of the need of storing the image data of the pattern light projection image for the calculation of the plane image carried out by the external calculating device. Therefore, storage capacity can be saved in the three-dimensional shape detecting device compared to cases where both the image data of the pattern light projection image and the image data of the pattern light non-projection image are stored. Since relatively low-load calculations are executed by the three-dimensional shape detecting device and a relatively high-load process is executed by the external calculating device, the total performance of the three-dimensional shape detecting system can be enhanced by implementing the external calculating device by a high-performance device, for example.

Since the data supplied from the three-dimensional shape detecting device to the external calculating device are the image data of the pattern light non-projection image and the three-dimensional shape data, the data size is reduced considerably compared to cases where both the image data of the pattern light non-projection image and the image data of the pattern light projection image are supplied to the external calculating device. Therefore, the amount of data necessary when image data is supplied from the three-dimensional shape detecting device to the external calculating device can be reduced, and in cases where image data is transferred by data communication between the three-dimensional shape detecting device and the external calculating device, for example, reduction of communication time can be achieved.

In order to achieve the above object, another aspect of the present invention provides a three-dimensional shape detecting program comprising: an image data obtaining step of obtaining image data of a pattern light projection image of a subject on which pattern light is projected and image data of a pattern light non-projection image of the subject on which the pattern light is not projected; and a pattern light position extraction step of extracting a position of the pattern light projected on the subject based on the image data obtained in the image data obtaining step. Further, the three-dimensional shape detecting program comprises: a three-dimensional shape calculation step of figuring out three-dimensional shape data of the subject based on the position of the pattern light extracted in the pattern light position extraction step; a storage step of storing the image data of the pattern light non-projection image and the three-dimensional shape data in storage means; and an image correction step of correcting the pattern light non-projection image into a plane image in which the subject is observed from a direction substantially orthogonal to a prescribed surface of the subject based on the image data of the pattern light non-projection image and the three-dimensional shape data stored in the storage means in the storage step.

With the above configuration, a three-dimensional shape detecting device of a three-dimensional shape detecting system is relieved of the need of storing the image data of the pattern light projection image for the calculation of the plane image. Therefore, storage capacity can be saved in the three-dimensional shape detecting device compared to cases where both the image data of the pattern light projection image and the image data of the pattern light non-projection image are stored. Since the three-dimensional shape detecting system can be designed to let the three-dimensional shape detecting device execute relatively low-load calculations and let the external calculating device execute a relatively high-load process (image correction step), the total performance of the three-dimensional shape detecting system can be enhanced by implementing the external calculating device by a high-performance device, for example.

In order to achieve the above object, another aspect of the present invention provides a three-dimensional shape detecting program comprising: an image data obtaining step of obtaining image data of a pattern light projection image of a subject on which pattern light is projected and image data of a pattern light non-projection image of the subject on which the pattern light is not projected; and a pattern light position extraction step of extracting a position of the pattern light projected on the subject based on the image data obtained in the image data obtaining step. Further, the three-dimensional shape detecting program comprises: a three-dimensional shape calculation step of figuring out three-dimensional shape data of the subject based on the position of the pattern light extracted in the pattern light position extraction step; a transmission step of transmitting the image data of the pattern light non-projection image and the three-dimensional shape data to an external calculating device; and an image correction step of receiving the image data of the pattern light non-projection image and the three-dimensional shape data transmitted by the transmission step and correcting the pattern light non-projection image into a plane image in which the subject is observed from a direction substantially orthogonal to a prescribed surface of the subject based on the image data of the pattern light non-projection image and the three-dimensional shape data.

With the above configuration, the data supplied from a three-dimensional shape detecting device to an external calculating device in a three-dimensional shape detecting system can be restricted to the image data of the pattern light non-projection image and the three-dimensional shape data, by which the amount of data can be reduced considerably compared to cases where both the image data of the pattern light non-projection image and the image data of the pattern light projection image are supplied to the external calculating device. Therefore, the amount of data necessary when image data is supplied from the three-dimensional shape detecting device to the external calculating device can be reduced, and reduction of communication time can be achieved in data communication between the three-dimensional shape detecting device and the external calculating device.

BRIEF DESCRIPTION OF THE ACCOMPANYING DRAWINGS

FIG. 1(a) is an external perspective view of a three-dimensional shape detecting system in accordance with an embodiment of the present invention.

FIG. 1(b) is a schematic sectional view of an image capturing device as one of the components of the three-dimensional shape detecting system.

FIGS. 3(a) and 3(b) are schematic diagrams for explaining angular widths of slit beams.

Figure 4:
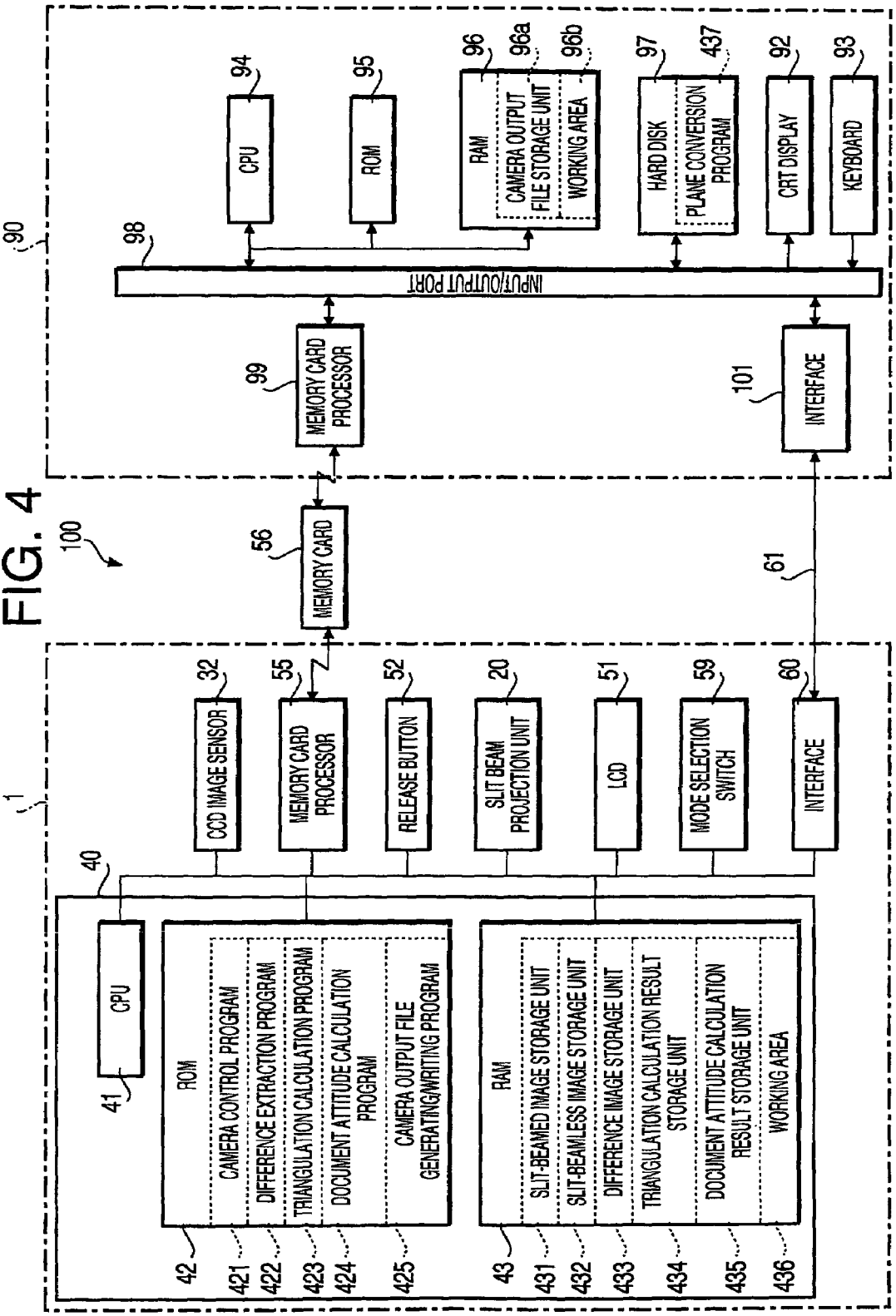

FIG. 4 is a block diagram showing the electrical configuration of the three-dimensional shape detecting system.

Figure 5:
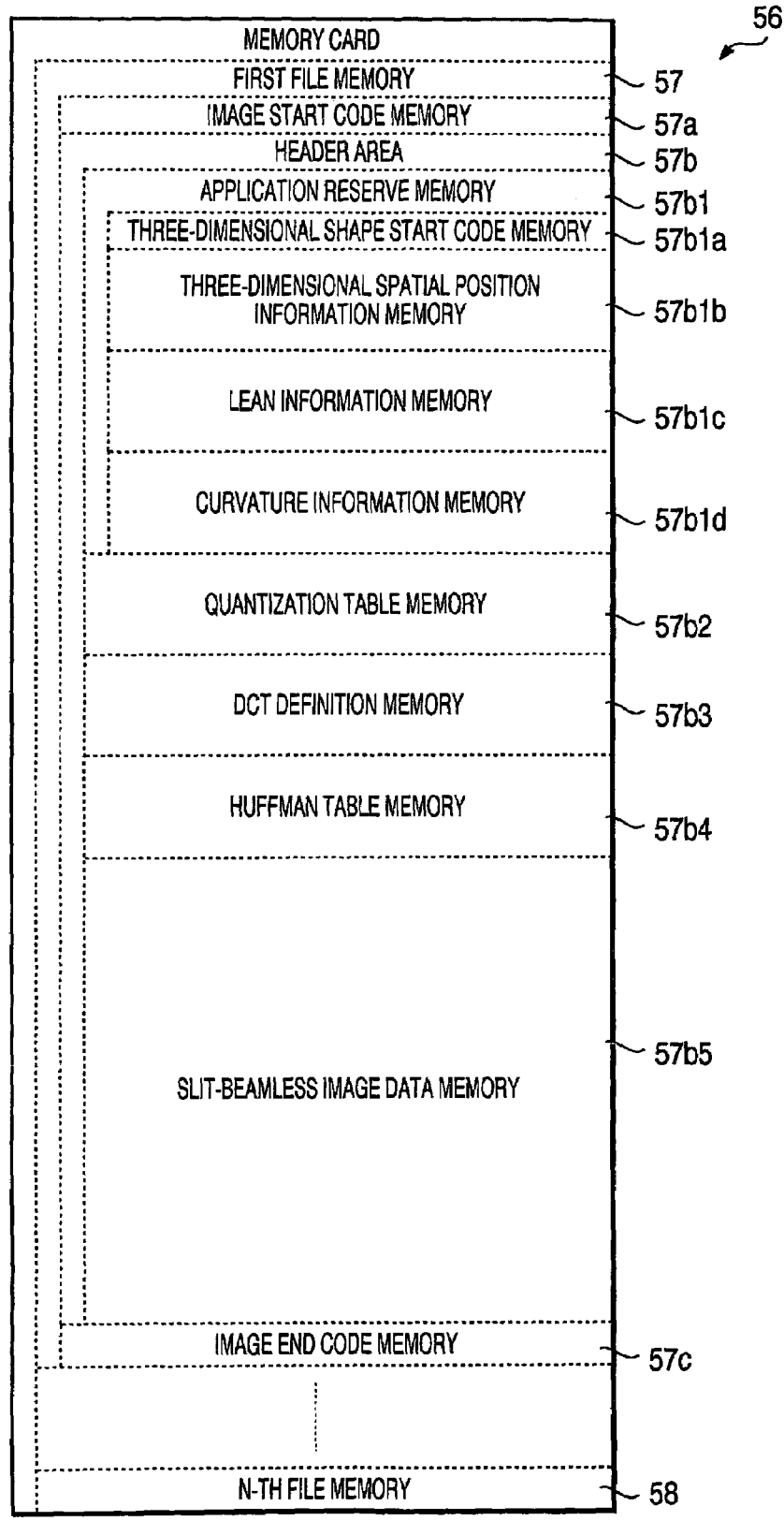

FIG. 5 is a schematic diagram showing the composition of a memory card.

Figure 6:
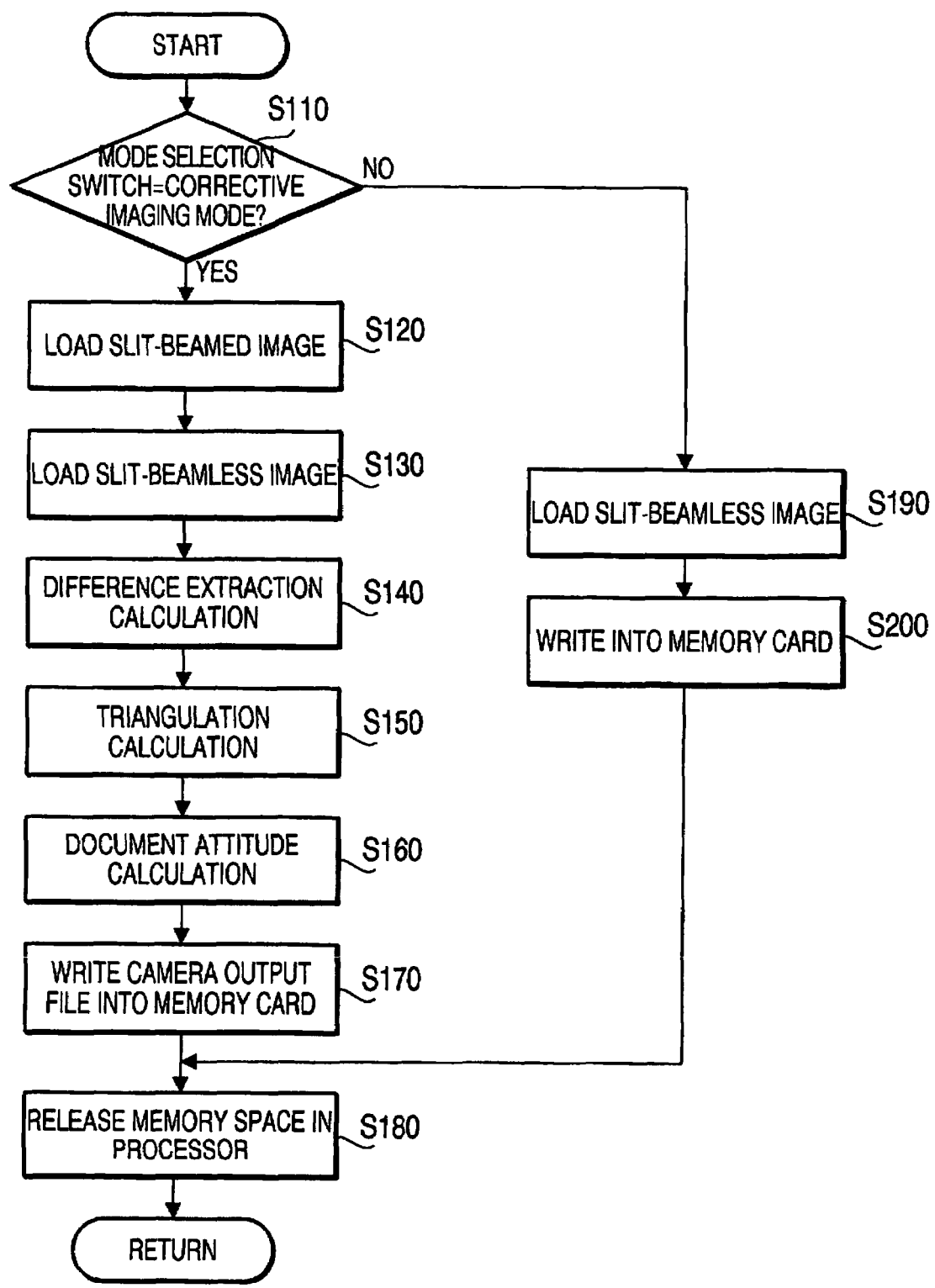

FIG. 6 is a flow chart showing a process executed by a processor of the image capturing device.

FIGS. 7(a) and 7(b) are schematic diagrams for explaining a slit-beamed image.

FIGS. 8(a) and 8(b) are schematic diagrams for explaining a method for calculating three-dimensional spatial positions of the slit beams.

FIGS. 9(a), 9(b) and 9(c) are schematic diagrams for explaining a coordinate system used for document attitude calculation.

Figure 10:
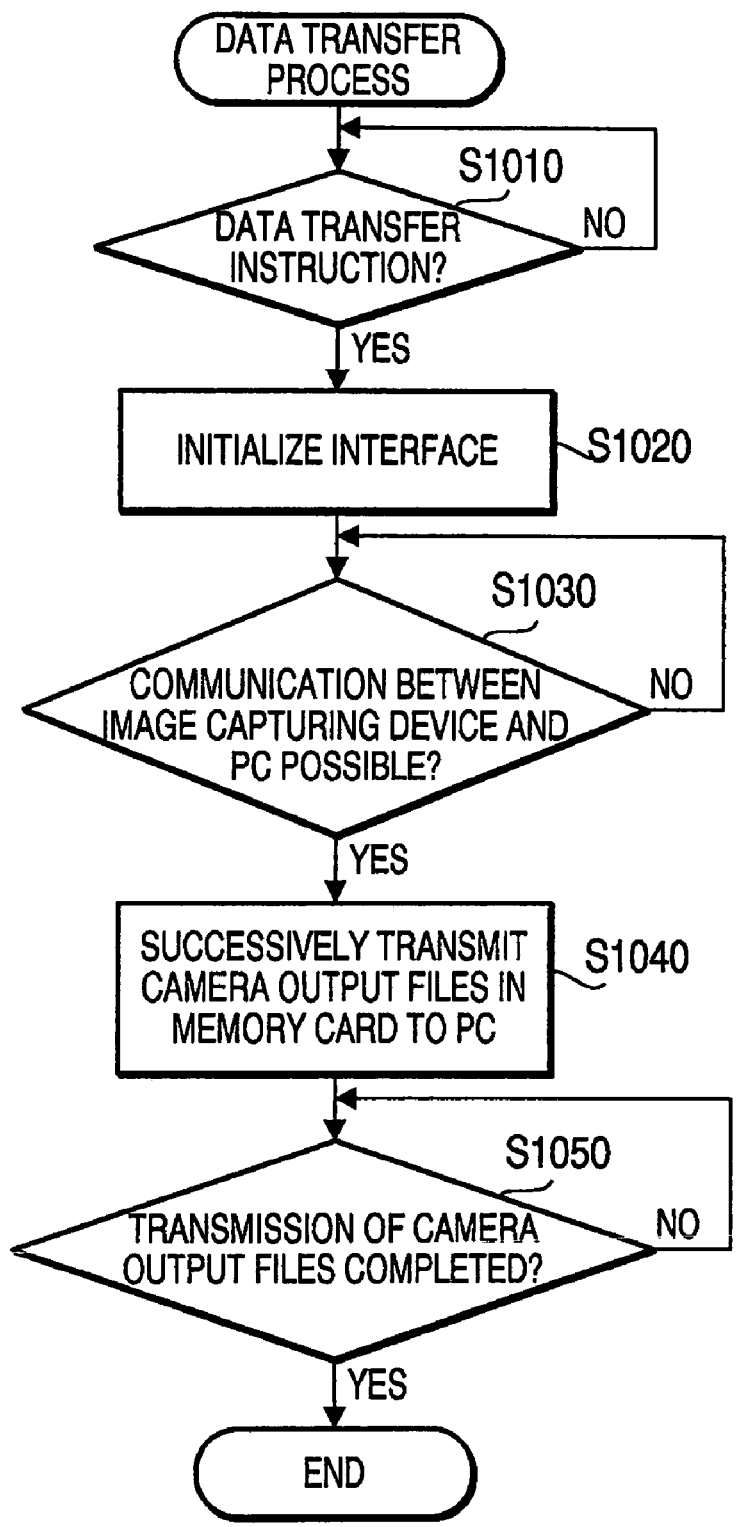

FIG. 10 is a flow chart showing a data transfer process.

Figure 11:
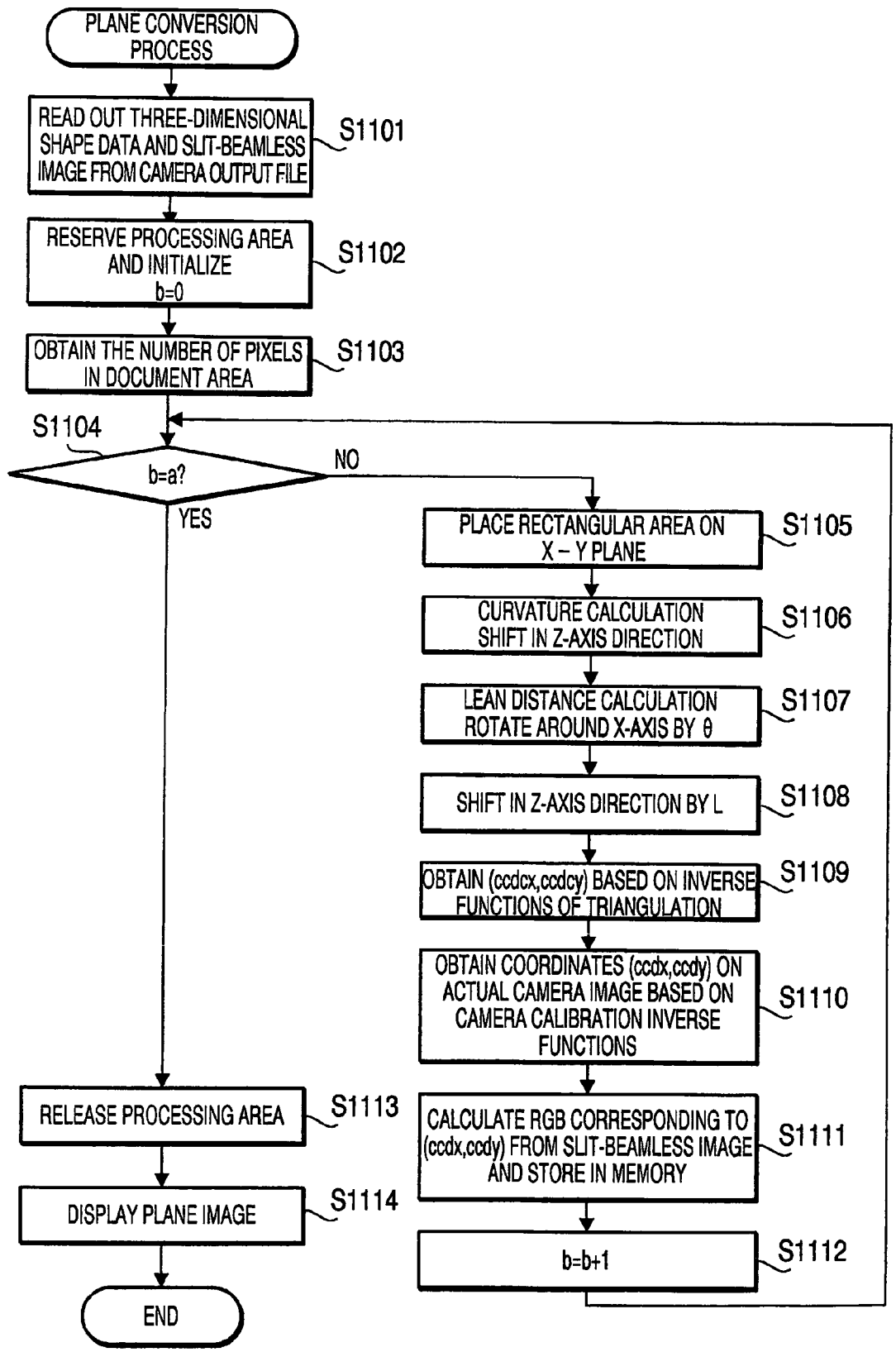

FIG. 11 is a flow chart showing a plane conversion process.

DESCRIPTION OF THE REFERENCE CHARACTERS 1 image capturing device
20 slit beam projection unit
21 laser diode
32 CCD image sensor
56 memory card
90 personal computer
100 three-dimensional shape detecting system
421 camera control program
422 difference extraction program
423 triangulation calculation program
423 plane conversion program
424 document attitude calculation program
425 camera output file generating/writing program
431 slit-beamed image storage unit
432 slit-beamless image storage unit

DETAILED DESCRIPTION OF THE EMBODIMENTS

Referring now to the drawings, a description will be given in detail of a preferred embodiment in accordance with the present invention. FIG. 1(a) is an external perspective view of a three-dimensional shape detecting system 100. FIG. 1(b) is a schematic sectional view of an image capturing device 1 as one of the components of the three-dimensional shape detecting system 100. Incidentally, FIG. 1(b) shows a state in which a document P as the subject of image capturing is being shot by the image capturing device 1 from a direction oblique to the surface of the document P.

The three-dimensional shape detecting system 100 includes the image capturing device 1 and a general-purpose personal computer 90 (hereinafter referred to as a "PC 90"). The three-dimensional shape detecting system 100 is a system capable of correcting a captured image (an image of the subject shot by the image capturing device 1 from an oblique direction) into a plane image representing the subject as if the subject were observed from a direction substantially orthogonal to a prescribed surface of the subject.

The image capturing device 1 includes a body case 10 in a box shape, an imaging lens 31 provided at the front of the body case 10, a CCD image sensor 32 placed at the rear of the imaging lens 31 (inside the image capturing device 1) and a slit beam projection unit 20 placed underneath the imaging lens 31. The image capturing device 10 further includes a processor 40 installed in the body case 10, a release button 52 and a mode selection switch 59 placed on top of the body case 10, and a memory card processor 55. The above components of the image capturing device 1 are connected together by signal lines. The memory card processor 55 functions as an interface for detachably attaching a portable memory card 56 to the image capturing device 1.

The image capturing device 1 is further equipped with an LCD (Liquid Crystal Display) 51 provided on the back of the body case 10 and a finder 53 provided to penetrate the body case 10 from its back to front. The LCD 51 and the finder 53 are used when the user decides an imaging range to be captured by the image capturing device 1.

The imaging lens 31 is formed by a plurality of lenses. The image capturing device 1 has the autofocus function, by which the imaging lens 31 is driven, the focal length and aperture are adjusted automatically, and light from the outside is focused on the CCD image sensor 32.

The CCD image sensor 32 includes a matrix-like array of photoelectric transducers such as CCDs (Charge Coupled Devices). The CCD image sensor 32 generates signals corresponding to colors and intensities of light of the image forming on its surface, converts the signals into digital data, and outputs the digital data to the processor 40. Incidentally, data outputted by one CCD is pixel data of one pixel forming the image. A piece of image data includes the same number of pixel data as the CCDs.

Figure 2:
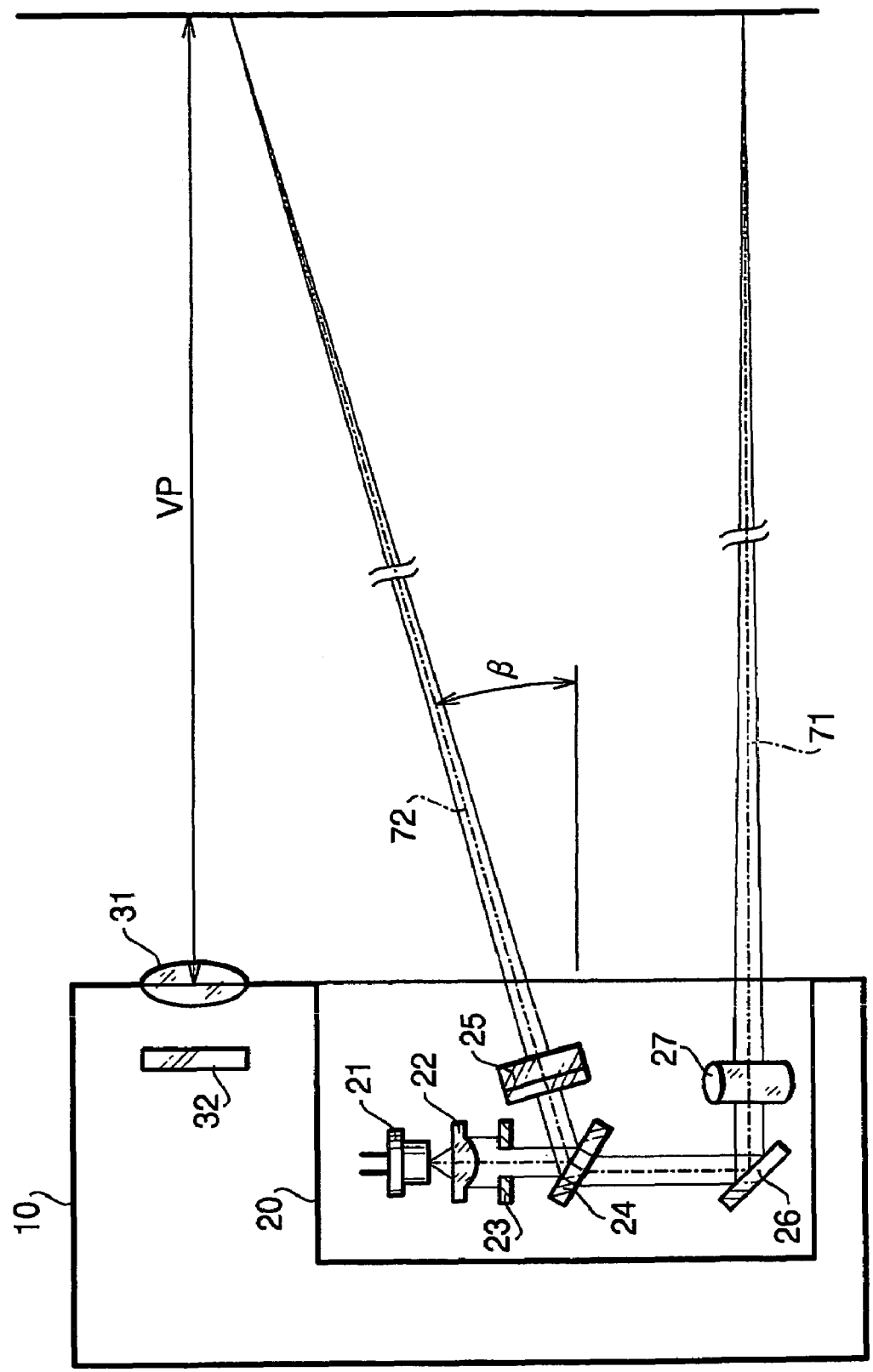
FIG. 2 is a schematic diagram showing the detailed composition of a slit beam projection unit of the image capturing device.

The slit beam projection unit 20 will be explained below referring to FIGS. 2, 3(a) and 3(b). FIG. 2 is a schematic diagram showing the composition of the slit beam projection unit 20. FIGS. 3(a) and 3(b) are schematic diagrams for explaining angular widths of slit beams. The slit beam projection unit 20 includes a laser diode 21, a collimator lens 22, an aperture 23, a transparent flat plate 24, a cylindrical lens 25, a reflecting mirror 26 and a rod lens 27.

The laser diode 21 emits a red laser beam. The ON-OFF switching of the laser beam emission by the laser diode 21 is controlled according to instructions outputted by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 20.

The aperture 23, formed by a plate having a rectangular opening part, shapes the laser beam from the collimator lens 22 into a rectangular shape by letting part of the laser beam through the opening part.

The transparent flat plate 24 is composed of a transparent flat plate made of pure glass material, for example. The back of the transparent flat plate 24 is provided with an AR coat (antireflection coating). The transparent flat plate 24 is tilted toward the front of the body case 10 by a prescribed angle β (e.g. 33 degrees) with respect to a plane orthogonal to the optical axis of the laser beam from the aperture 23. The transparent flat plate 24 reflects approximately 5% (approximately 50 μW) of the power of the laser beam from the aperture 23 by its surface while transmitting approximately 95% (approximately 950 μW). In the following explanation, the direction into which the laser beam is reflected by the transparent flat plate 24 (frontward from the image capturing device 1 and 33 degrees upward relative to the horizontal plane) will be referred to as a "second direction".

Thanks to the AR coat provided on the back of the transparent flat plate 24, reflection occurring when the laser beam entering the transparent flat plate 24 emerges therefrom is suppressed, by which loss of the laser beam inside the transparent flat plate 24 is reduced. Further, by setting the ratio of the laser beam reflected by the transparent flat plate 24 at a surface reflectance 5% which is determined by the refractive index of the material of the transparent flat plate 24, a process for forming a vapor-deposited metal film on the reflecting surface (necessary when the component is implemented by an ordinary half mirror) can be left out.

The reflecting mirror 26 includes a member (mirror, etc.) totally reflecting the laser beam. The reflecting mirror 26 is placed on the downstream side of the transparent flat plate 24 transmitting the laser beam, while being tilted toward the front of the body case 10 by 45 degrees. The reflecting mirror 26 totally reflects the laser beam and changes its optical path direction by 90 degrees. In the following explanation, the direction into which the laser beam is reflected by the reflecting mirror 26 (frontward from the image capturing device 1 and at 0 degrees relative to the horizontal plane) will be referred to as a "first direction".

The rod lens 27 is formed by a lens of a cylindrical shape having a short positive focal length. The rod lens 27 is placed on the downstream side of the reflecting mirror 26 reflecting the laser beam so that the axis of the cylindrical shape will be in the vertical direction. Since the focal length of the rod lens 27 is short, the laser beam passing through the rod lens 27 immediately spreads after crossing a focal point in the vicinity of the rod lens 27 and is outputted in the first direction as a spreading slit beam having a prescribed spread angle $\epsilon$ (e.g. 48 degrees, see FIG. 3($a$)). Incidentally, the slit beam emerging from the rod lens 27 will hereinafter be referred to as a "first slit beam 71".

The cylindrical lens 25 has a concave shape on its one side to have a negative focal length. The cylindrical lens 25 is placed on the downstream side of the transparent flat plate 24 reflecting the laser beam so that its lens surface will be orthogonal to the second direction. The cylindrical lens 25 receives the laser beam incident from the transparent flat plate 24 and outputs the laser beam as a slit beam having a spread angle $\kappa$ (see FIG. 3($b$)). Incidentally, the slit beam emerging from the cylindrical lens 25 will hereinafter be referred to as a "second slit beam 72". The spread angle $\kappa$ of the second slit beam 72 is set so that the ratio between the spread angle $\epsilon$ of the first slit beam 71 and the spread angle K of the second slit beam 72 will be substantially equal to the power ratio between the laser beams split by the transparent flat plate 24. Therefore, the spread angle $\kappa$ of the second slit beam 72 is 5% of the spread angle $\epsilon$ ($\kappa$=2.4 degrees).

With the above configuration, the slit beam projection unit 20 lets the laser diode 21 emit the laser beam according to instructions from the processor 40 and thereby outputs the first and second slit beams 71 and 72 in the first and second directions respectively through a window 29 of the body case 10 formed under the imaging lens 31.

In the slit beam projection unit 20 configured as above, the power of the second slit beam 72 relative to the total power outputted by the laser diode 21 is as small as approximately 5% while the power of the first slit beam 71 split by the transparent flat plate 24 is 95%; however, the power of the first slit beam 71 (spread angle: 48 degrees) per unit angular width (approximately 20 µW/degree) is substantially equal to that (approximately 21 µW/degree) of the second slit beam 72 (spread angle: 2.4 degrees). When the document P is white paper that is placed the reference distance VP (330 mm) away from the slit beam projection unit 20, the illumination intensity achieved by the first and second slit beams 71 and 72 is approximately 1260 lux. Therefore, a sufficient difference in luminance can be secured between the document P and loci of the slit beams even in places where the illumination intensity is 500-1000 lux (average room illumination) and a locus image of the slit beams can be extracted reliably by a difference extraction program 422 which will be explained later.

The explanation will be continued referring again to FIG. 1. The release button 52 is made of a push button switch. The release button 52 is connected to the processor 40 and the pressing of the release button 52 by the user is detected by the processor 40.

The mode selection switch 59 is implemented by a slide switch that is switchable between two positions, for example. The position of the switch of the mode selection switch 59 is detected by the processor 40. The two switch positions of the mode selection switch 59 have been assigned to the processor 40 so that one will be recognized as a "normal mode" and the other as a "corrective imaging mode". The "normal mode" is a mode in which image data is generated directly from an image of the document P shot by the image capturing device 1. The "corrective imaging mode" is a mode in which the image data is corrected into image data representing the document P shot from the front when the document P is shot from an oblique direction.

The memory card processor 55 is a device for processing the memory card 56. The memory card processor 55 is a read/write device for reading out data stored in the memory card 56 and inputting the data into the image capturing device 1, while writing data outputted by the image capturing device 1 into the memory card 56. The memory card 56 processed by the memory card processor 55 is implemented by a nonvolatile rewritable memory designed to be attachable and detachable to/from the image capturing device 1. An opening 56$a$ for the attachment of the memory card 56 is formed on a side face of the image capturing device 1.

The LCD 51 includes a liquid crystal display for displaying images, The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the memory card 56, image signals for displaying characters indicating the settings of the device, etc.

The finder 53, including an optical lens, is formed so that the user looking into the finder 53 from the rear of the image capturing device 1 can view a range substantially equal to the range of the image formed by the imaging lens 31 on the CCD image sensor 32.

Meanwhile, the PC 90 as a component of the three-dimensional shape detecting system 100 is equipped with a plane conversion program 437 which will be explained later. The plane conversion program 437 performs calculations for correcting a captured image (an image of the document P shot by the image capturing device 1 from an oblique direction) into a plane image (in which the document P is observed from a direction substantially orthogonal to a prescribed surface of the document P) and outputs the corrected image.

The PC 90 includes a body case 91, a CRT display 92 for displaying output images, etc., and a keyboard 93 used for inputting an instruction for activating the plane conversion program 437, etc. A card slot 91$a$ for the attachment of the memory card 56 is formed on the body case 91. Data stored in the memory card 56 in the image capturing device 1 can be read out by a memory card processor 99 of the PC 90 when the memory card 56 is inserted in the card slot 91a. In short, the memory card processor 99 functions as an interface for detachably attaching the portable memory card 56 to the PC 90.

The PC 90 is equipped with an interface 101 on the PC side (see FIG. 4), as a transfer means for communicating data between the PC 90 and the image capturing device 1. Meanwhile, the image capturing device 1 is equipped with an interface 60. In the three-dimensional shape detecting system 100, the interface 101 and the interface 60 (i.e. the PC 90 and the image capturing device 1) are connected together by a communication cable 61 to enable data communication (see FIG. 4). A wired serial bus (e.g. USB) or wireless LAN modules (e.g. WIFI) can be employed as such a communication means.

Incidentally, it is also possible to employ an external processing unit (a portable tablet, a compact PDA, a processor system installed in a cellular phone, etc.) as the PC 90 if the unit has a higher processing speed than the image capturing device 1.

FIG. 4 is a block diagram showing the electrical configuration of the three-dimensional shape detecting system. The processor 40 installed in the image capturing device 1 includes a CPU 41, a ROM 42 and a RAM 43.

The CPU 41 executes various processes according to programs stored in the ROM 42 while using the RAM 43. The processes executed by the CPU 41 include the detection of the pressing of the release button 52, the reading of image data from the CCD image sensor 32, the writing of image data into the memory card 56, the detection of the status of the mode selection switch 59, the switching of the slit beam emission from the slit beam projection unit 20, etc.

The ROM 42 stores a camera control program 421, a difference extraction program 422, a triangulation calculation program 423, a document attitude calculation program 424 and a camera output file generating/writing program 425. The camera control program 421 is a program for the overall control of the image capturing device 1, including a process shown in a flow chart of FIG. 6 (details will be explained later). The difference extraction program 422 is a program for generating image data in which loci of the slit beams are extracted from an image of the document P onto which the slit beams are projected. The triangulation calculation program 423 is a program for calculating a three-dimensional spatial position for each pixel of the loci of the slit beams in the image data generated by the difference extraction program. The document attitude calculation program 424 is a program for estimating the three-dimensional shape of the document P based on the three-dimensional spatial positions of loci 71a and 72a of the first and second slit beams. The camera output file generating/writing program 425 is a program for generating a file to be stored in the memory card 56 and writing the generated file into the memory card 56.

In the RAM 43, a slit-beamed image storage unit 431, a slit-beamless image storage unit 432 and a difference image storage unit 433 (each of which has a size for storing data of a certain image data format outputted by the CCD image sensor 32) and a triangulation calculation result storage unit 434 (having a size for storing the calculation result of the position of each point of the slit-beamed image) are reserved as storage areas. Further, a document attitude calculation storage unit 435 (having a size for storing the calculation result of the position and attitude of the document P) and a working area 436 (having a size for temporarily storing data for the calculations by the CPU 41) are also reserved in the RAM 43 as storage areas.

Meanwhile, the PC 90 includes a CPU 94, a ROM 95, a RAM 96, a hard disk 97 and an input/output port 98. In the RAM 96, a camera output file storage unit 96a for storing data transmitted from the image capturing device 1 via the communication cable 61 and a working area 96b for temporarily storing data for the calculations by the CPU 94 are reserved. The hard disk 97 is a rewritable nonvolatile memory. The hard disk 97 stores a plane conversion program 437 for converting image data transferred from the image capturing device 1 into image data of the document P shot from the front.

Next, the composition of the memory card 56 will be described referring to FIG. 5. FIG. 5 is a schematic diagram for explaining the composition of the memory card 56. In the memory card 56, first through n-th file memories 57-58 are reserved for images captured by the image capturing device 1 as camera output files. In each file memory (57, 58), an image start code memory 57a, a header area 57b and an image end code memory 57c are reserved.

The image start code memory 57a is memory for storing a code representing the start of image data. When the image start code is read out, the reading of data stored in a corresponding file is started.

In the header area 57b, an application reserve memory 57b1, a quantization table memory 57b2, a DCT definition memory 57b3, a Huffman table memory 57b4 and a slit-beamless image data memory 57b5 are reserved.

The application reserve memory 57b1 is memory for storing application-dependent information. In the application reserve memory 57b1, a three-dimensional shape start code memory 57b1a, a three-dimensional spatial position information memory 57b1b, a lean information memory 57b1c and a curvature information memory 57b1d are reserved.

The three-dimensional shape start code memory 57b1a is memory for storing a code for starting the reading of three-dimensional shape data which includes three-dimensional spatial position information, lean information and curvature information on the subject. The three-dimensional spatial position information memory 57b1b is memory for storing the three-dimensional spatial position information on the document P. The lean information memory 57b1c is memory for storing the lean information on the document P. The curvature information memory 57b1d is memory for storing the curvature information on the document P. Incidentally, it is not absolutely necessary to place the area for storing the three-dimensional shape data inside the application reserve memory 57b1 or the header area 57b, as long as the area is in the same file as the header area 57b.

The quantization table memory 57b2 is memory for storing a quantization table which is used for quantizing or digitizing the result of DCT conversion of image data. The DCT definition memory 57b3 is memory for storing a code defining a CDT conversion type and parameters for the conversion. The Huffman table memory 57b4 is memory for storing a table which is used for entropy compression of the quantized values. The slit-beamless image data memory 57b5 is memory for storing image data of a slit-beamless image captured by the image capturing device 1.

The image end code memory 57c is memory for storing a code representing the end of image data. When the image end code is read out, the reading of data stored in the first file memory 57 is ended.

In the following, the operation of the above image capturing device 1 after the release button 52 is pressed by the user will be explained referring to FIG. 6. FIG. 6 is a flow chart showing a process executed by the processor 40 of the image capturing device 1.

When the release button 52 is pressed by the user, the switch position of the mode selection switch 59 is detected and whether the switch is at the position of the "corrective imaging mode" or not is judged (S110). If the mode selection switch 59 is at the position of the "corrective imaging mode" (S110: YES), an instruction for the emission by the laser diode 21 is issued to the slit beam projection unit 20. With the first and second slit beams 71 and 72 projected by the slit beam projection unit 20, image data is obtained from the CCD image sensor 32 as the slit-beamed image. The obtained image data is loaded into the slit-beamed image storage unit 431 of the RAM 43 (S120).

After the loading of the slit-beamed image (S120), an instruction for stopping the emission by the laser diode 21 is issued to the slit beam projection unit 20 and image data, without the first and second slit beams 71 and 72 projected by the slit beam projection unit 20, is obtained from the CCD image sensor 32 as the slit-beamless image. The obtained image data is loaded into the slit-beamless image storage unit 432 (S130).

After the loading of the image data of the slit-beamed image and the slit-beamless image (S120, S130), the difference between the image data in the slit-beamed image storage unit 431 and the image data in the slit-beamless image storage unit 432 is loaded in the difference image storage unit 433 by the difference extraction program 422 (S140). In other words, image data, in which the loci 71a and 72a of the first and second slit beams projected on the document P have been extracted, is loaded in the difference image storage unit 433 (S140).

In the difference extraction calculation step (S140), RGB values of each pixel in the image data loaded in the slit-beamless image storage unit 432 are subtracted from those of a corresponding pixel in the image data loaded in the slit-beamed image storage unit 431, by which a multivalued image, in which only the loci of the slit beams have been extracted, is obtained.

After the image data extracting the loci 71a and 72a of the first and second slit beams is generated by the difference extraction calculation step (S140), a three-dimensional spatial position of each pixel of the loci 71a and 72a of the first and second slit beams is calculated by the triangulation calculation program 423 based on the image data and each calculation result is loaded in the triangulation calculation result storage unit 434 (S150).

In the triangulation calculation step (S150), the following calculations are executed, for example. Based on the image data loaded in the difference image storage unit 433, peaks of the loci 71a and 72a of the first and second slit beams in regard to the lengthwise direction are determined for each coordinate value in the crosswise direction of the image data by means of barycenter calculation, and a three-dimensional spatial position corresponding to each peak extraction coordinate is determined as explained below.

FIGS. 7(a) and 7(b) are schematic diagrams for explaining the slit-beamed image. FIGS. 8(a) and 8(b) are schematic diagrams for explaining a method for calculating the three-dimensional spatial positions of the slit beams. A coordinate system of the image capturing device 1 with respect to the document P (curved in the crosswise direction) being shot as shown in FIG. 7(a) is represented as shown in FIGS. 8(a) and 8(b). In FIGS. 8(a) and 8(b), the optical axis direction of the imaging lens 31 is defined as a Z-axis. A position that is a reference distance VP away from the image capturing device 1 is defined as the origin of X, Y and Z-axes. A horizontal direction and a vertical direction with respect to the image capturing device 1 are defined as an X-axis direction and a Y-axis direction, respectively.

The number of pixels of the CCD image sensor 32 in the X-axis direction will be called "ResX" and that in the Y-axis direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 71 emitted from the slit beam projection unit 20 is assumed to be "D". The position of an intersection point of the first slit beam 71 and the X-Y plane measured in the Y-axis direction will be called "las1". The position of an intersection point of the second slit beam 72 and the X-Y plane measured in the Y-axis direction will be called "las2".

Under the above definitions, a three-dimensional spatial position (X1, Y1, Z1) corresponding to coordinates (cedx1, cedy1) of an attention point 1 (when a pixel of the image of the locus 71a of the first slit beam is paid attention to) on the CCD image sensor 32 is figured out from solutions of the following five simultaneous equations regarding triangles formed by the point on the imaging surface of the CCD image sensor 32, the emission point of the first and second slit beams 71 and 72, and intersection points with the X-Y plane.

$$Y1=-((las1+D)/VP)Z1+las1 \quad (1)$$

$$Y1=-(Ytarget/VP)Z1+Ytarget \quad (2)$$

$$X1=-(Xtarget/VP)Z1+Xtarget \quad (3)$$

$$Xtarget=Xfstart+(ccdx1/ResX)\times(Xfend-Xfstart) \quad (4)$$

$$Ytarget=Yftop-(ccdy1/ResY)\times(Yftop-Yfbottom) \quad (5)$$

Incidentally, las1=−D and thus Y1=−D in this embodiment since the first slit beam 71 is parallel to the Z-axis.

Similarly, a three-dimensional spatial position (X2, Y2, Z2) corresponding to coordinates (cedx2, ccdy2) of an attention point 2 (when a pixel of the image of the locus 72a of the second slit beam is paid attention to) on the CCD image sensor 32 is figured out from solutions of the following five simultaneous equations.

$$Y2=-((las2+D)/VP)Z2+las2 \quad (1)$$

$$Y2=-(Ytarget/VP)Z2+Ytarget \quad (2)$$

$$X2=-(Xtarget/VP)Z2+Xtarget \quad (3)$$

$$Xtarget=Xfstart+(ccdx2/ResX)\times(Xfend-Xfstart) \quad (4)$$

$$Ytarget=Yftop-(ccdy2/ResY)-(Yftop-Yfbottom) \quad (5)$$

After the three-dimensional spatial positions of the slit beams are calculated as above (S150), the position and attitude of the document P are calculated by the document attitude calculation program 424 based on the three-dimensional spatial positions of the slit beams (S160). The document attitude calculation step (S160) will be explained here referring to FIGS. 9(a)-9(c). FIGS. 9(a)-9(c) are schematic diagrams for explaining a coordinate system used for the document attitude calculation.

The document attitude calculation step (S160) is executed as follows, for example. A curve is obtained by executing regression curve approximation to points at the three-dimensional spatial positions corresponding to the locus 71*a* of the first slit beam based on the data stored in the triangulation calculation result storage unit 434. A straight line connecting a point on the curve where the position in the X-axis direction is "0" and a three-dimensional spatial position on the locus 72*a* of the second slit beam where the position in the X-axis direction is "0" is assumed, and an intersection point of the straight line and the Z-axis (i.e. an intersection point of the optical axis and the document P) is obtained as a three-dimensional spatial position (0, 0, L) of the document P (see FIG. 9(*a*)) while the angle of the straight line with respect to the X-Y plane is obtained as a lean θ of the document P around the X-axis.

Further, as shown in FIG. 9(*b*), a state in which the curve obtained by the regression curve approximation of the locus 71*a* of the first slit beam is rotated by −θ (θ: the lean of the document P around the X-axis obtained above), that is, a state in which the document P is placed in parallel with the X-Y plane, is assumed. Subsequently, a cross section of the document P on the X-Z plane is considered as shown in FIG. 9(*c*). In the sectional form of the document P in the X-axis direction, displacements of the cross section in the Z-axis direction are obtained for a plurality of positions in the X-axis direction, and based on the displacements, curvature φ(X) indicating the gradient with respect to the X-axis direction is obtained as a function of the position X in the X-axis direction.

After the three-dimensional spatial position L and the attitude (the lean θ and the curvature φ) of the document P are calculated by the document attitude calculation step (S160), the image data of the slit-beamless image loaded in the slit-beamless image storage unit 432 is written into the slit-beamless image data memory 57*b*5 in the memory card 56 by the camera output file generating/writing program 425. Meanwhile, the three-dimensional spatial position L, the lean θ and the curvature φ of the document P which have been calculated corresponding to the slit-beamless image are written into the three-dimensional spatial position information memory 57*b*1*b*, the lean information memory 57*b*1*c* and the curvature information memory 57*b*1*d* in the memory card 56, respectively. The three-dimensional shape data is made up of the three-dimensional spatial position L, the lean θ and the curvature φ. By the above operation, a three-dimensional shape data file is generated as the camera output file (S170).

Incidentally, the timing for the writing of the image data of the slit-beamless image loaded in the slit-beamless image storage unit 432 into the slit-beamless image data memory 57*b*5 in the memory card 56 is not restricted to the above timing; the writing may also be executed after the difference extraction calculation step (S140), for example.

In the aforementioned step S110, if the mode selection switch 59 is not at the "corrective imaging mode" but at the "normal mode" (S110: NO), a slit-beamless image is obtained from the CCD image sensor 32 with no laser beam emitted from the laser diode 21 and no first and second slit beams 71 and 72 outputted by the slit beam projection unit 20 (S190). In the next step S200, the obtained image data is written into the slit-beamless image data memory 57*b*5 in the memory card 56. In the "normal mode", the three-dimensional spatial position L, the lean θ and the curvature φ of the document P which have been explained above are not calculated, and thus such data are not written into the memory card 56.

After the image data of the slit-beamless image (with or without the three-dimensional spatial position L, the lean θ and the curvature φ of the document P) is written into the memory card 56 as above (S170, S200), memory space in the processor 40 is released (S180). Since no slit-beamed image data is written into the memory card 56, the maximum number of images that can be shot is not deteriorated in contrast with cases where both slit-beamless image data and slit-beamed image data are stored in the memory card 56. While it is also possible to efficiently use the memory card 56 by compressing image data, the avoidance of the writing of slit-beamed image data into the memory card 56 has a significant effect on the maximum number of images that can be shot (storable in the memory card 56) since storing image data requires considerably large capacity even when the image compression is employed. Since the image data of the slit-beamed image may be deleted any time after the difference extraction calculation step (S140), the image data may also be deleted in the interval between S140 and S170. In this case, the image data of the slit-beamed image loaded in the slit-beamed image storage unit 431 becomes inaccessible after S140, and thus the slit-beamed image data can never be written into the memory card 56 in the step S170.

Next, a data transfer process for transferring the data written in the memory card 56 as above to the PC 90 will be described referring to FIG. 10. Incidentally, FIG. 10 explains a case where the data is transmitted from the image capturing device 1 (to which the memory card 56 is attached) to the PC 90 via the communication cable 61.

At the start of the data transfer process, whether there has been a data transfer instruction by the user or not is judged (S1010). If the data transfer instruction has been issued (S1010: YES), the interface 60 is initialized (S1020). Subsequently, whether communication between the image capturing device 1 and the PC 90 is possible or not is judged (S1030). If the communication is possible (S1030: YES), each camera output file stored in each file memory (57, 58) in the memory card 56 is successively transmitted to the PC 90 (S1040). Thereafter, whether the transmission of the camera output files has been completed or not is judged (S1050). If the transmission has been completed (S1050: YES), this process is ended. Incidentally, the camera output files transmitted from the image capturing device 1 are loaded in the camera output file storage unit 96*a* of the RAM 96 via the interface 101 of the PC 90.

The above data transfer process is an example of data transfer from the image capturing device 1 to the PC 90 via the communication cable 61. It is also possible, instead of the above data transfer process, to transfer the camera output files from the image capturing device 1 to the PC 90 by detaching the memory card 56 from the image capturing device 1 and attaching it to the PC 90. In this case where the camera output files are transferred from the image capturing device 1 to the PC 90 via the memory card 56, the trouble of connecting the communication cable 61 to the image capturing device 1 and the PC 90 can be left out. Further, by preparing a plurality of memory cards 56, a lot of images can be captured even in places without the PC 90.

In the following, a plane conversion process, which is executed by the PC 90 for converting the image data of the slit-beamless image into image data of an image in which the document P is observed from the front after the image data is transferred from the image capturing device 1 to the PC 90 by the above data transfer process, will be described referring to a flow chart of FIG. 11.

First, the three-dimensional shape data and the slit-beamless image are read out from the camera output file which has been loaded in the camera output file storage unit 96*a* by the above data transfer process (S1101). Incidentally, in the case where the memory card 56 is attached to the PC 90, the camera output file is read out from the memory card 56. In the next step S102, a processing area for this process is reserved in the working area 96b of the RAM 96 and an initial value for a variable "b" used for this process (e.g. a variable for a counter) is set (S1102).

Subsequently, an area of an erect image (an image of a surface of the document P on which characters, etc. are drawn or printed, viewed substantially in the orthogonal direction) is set by transforming the four corner points of the slit-beamless image based on the three-dimensional spatial position (0, 0, L), the lean θ around the X-axis and the curvature φ (X) of the document P which have been obtained by the calculations by the document attitude calculation program 425, and the number "a" of pixels contained in the area is obtained (S1003).

Subsequently, whether the variable "b" has reached the number "a" of pixels or not is judged (S1104). The area of the erect image set as above is first placed on the X-Y plane (S1105). The three-dimensional spatial position of each pixel contained in the area is shifted in the Z-axis direction based on the curvature φ (X) (S1106), rotated around the X-axis by the lean θ (S1107), shifted in the Z-axis direction by the distance L (S1108). A three-dimensional spatial position obtained as above is converted into coordinates (ccdcx, ccdcy) on a CCD image captured by an ideal camera according to the aforementioned relational expressions of triangulation (S1109), and the coordinates (ccdcx, ccdcy) are converted into coordinates (ccdx, ccdy) on a CCD image captured by the actual camera by means of a well-known calibration technique based on aberration characteristics of the imaging lens 31 being used (S1110). The state of a pixel of the slit-beamless image at the position (ccdx, ccdy) determined as above is obtained and stored in the working area 96b of the RAM 96 (S1111). The above sequence is repeated for the number "a" of pixels (S1112, S1104), by which image data of the erect image is generated. Thereafter, the processing area reserved in the working area 96b is released (S1113), and a plane image generated based on the image data of the erect image is displayed on the CRT display 92 (S1114).

As explained above, the image capturing device 1 in the "imaging correction mode" projects two slit beams (the first and second slit beams 71 and 72) onto the document P, captures an image of the document P by letting the imaging lens 31 form the image on the CCD image sensor 32, and thereafter captures another image of the document P with no slit beams projected thereon. Subsequently, the image capturing device 1 extracts the locus image of the slit beams from the image data by calculating the difference between the two pieces of image data, and calculates the three-dimensional spatial position of each part of the loci of the slit beams according to the triangulation principle. Further, the image capturing device 1 determines the position, lean and curvature (three-dimensional shape data) of the document P from the calculated three-dimensional spatial positions, and writes the three-dimensional shape data and the image data of the slit-beamless image into the memory card 56.

The size of the image data of the slit-beamless image or slit-beamed image is some hundred Kbytes, while that of each piece of three-dimensional shape data of the document P (position L, lean θ, curvature φ) is approximately 4 bytes. Therefore, even if the curvature value φ is sampled in the document P tens of times, the data size of the three-dimensional shape data is some hundred bytes at most, which is negligible compared to the data size of the image data.

Compared to a case where an image capturing device executes the capturing of the slit-beamed image and the slit-beamless image only (storing image data of both the slit-beamed image and the slit-beamless image in a memory card) and the calculations for the difference extraction, the plane conversion, etc. are executed by a PC 90 to which the memory card is attached, the image capturing device 1 in accordance with the embodiment of the present invention is capable of reducing memory consumption of the memory card 56 by half even in the image capturing in the imaging correction mode. Therefore, the 50 percent reduction of the maximum number of images that can be shot by the image capturing device 1 for the memory card 56 can be avoided even when the image capturing in the imaging correction mode is executed. Also in the case where data written in the memory card 56 are transferred via the communication cable 61, communication time can be reduced to approximately half compared to the case where image data of both the slit-beamed image and the slit-beamless image are transferred.

By the plane conversion process executed by the PC 90 based on the data written in the memory card 56, even when a deformed (e.g. curved) document P is shot from an oblique direction, an image that has been corrected as if a flat document P were shot from the front can be outputted and displayed. Further, the image data of the slit-beamless image and the three-dimensional shape data (to be transferred from the image capturing device 1 as the camera output file when the plane conversion process is executed) is stored in one file, by which data handling can be simplified and the load on the PC 90 for the plane conversion process can be lessened.

In the above embodiment, the steps S120 and S130 in the flow chart of FIG. 6 correspond to "image data obtaining means" and an "image data obtaining step". The steps S140 and S150 in the flow chart of FIG. 6 correspond to "pattern light position extraction means" and a "pattern light position extraction step". The step S160 in the flow chart of FIG. 6 corresponds to "three-dimensional shape calculation means" and a "three-dimensional shape calculation step". The step S170 in the flow chart of FIG. 6 corresponds to "storage means" and a "storage step". The step S170 in the flow chart of FIG. 6 corresponds also to "data file generation means" and a "data file generation step".

While the present invention has been illustrated above with reference to an embodiment, in can easily be inferred that the present invention is not to be restricted by the above embodiment and various improvements and modifications are possible without departing from the scope and spirit of the present invention.

For example, the subject being shot by the image capturing device 1 is not restricted to a sheet-like document P but can also be a smooth surface of a solid block, a surface of an object having ridge lines, etc. The image capturing device in accordance with the embodiment of the present invention is capable of achieving the effect of detecting the three-dimensional shape of a subject, equally for any purpose seeking to figure out a three-dimensional shape in a three-dimensional space based on loci of substantially two slit beams.

However, if the subject is a sheet-like document P as in this embodiment, it is possible to estimate the shape of the whole document P by regarding the locus 71a of the first slit beam as a sectional form of the document P and thereby carry out the image correction in regard to deformation (e.g. curvature) of the document P. Further, when the subject has a three-dimensional shape substantially uniform in a direction orthogonal to the longitudinal direction of the slit beams, it is unnecessary to consider a shift in the detecting attitude due to peculiar shapes (protrusions, etc.) of parts of the subject onto which the slit beams are projected, by which the user is relieved of the need of being careful about the parts onto which the slit beams are projected.

While the slit beam projection unit 20 is configured to output two slit beams (the first and second slit beams 71 and 72) in the image capturing device 1 of this embodiment, the number of outputted slit beams is not restricted to two, that is, the image capturing device may be configured to output three or more slit beams. For example, the slit beam projection unit 20 may also be configured so that a third slit beam (in addition to the first and second slit beams 71 and 72) similar to the second slit beam 72 will be projected onto a part of the document P above the second slit beam 72 as depicted in FIG. 7(b) showing a locus image of the slit beams on the document P. In this case, a curved shape of the document P in its lengthwise direction can also be estimated based on the positions of points on the loci of the first through third slit beams, by which an image still easier to see can be generated by the correction of the slit-beamless image.

While the laser diode 21 emitting a red laser beam is used as the light source in this embodiment, various types of light sources capable of outputting an optical beam (plane emission laser, LED, EL device, etc.) can be employed as the light source.

The transparent flat plate 24 may be replaced with a transparent flat plate having a surface provided with a diffraction grating diffracting a prescribed ratio of the power of the incident laser beam in a particular direction. In this case, a 0th order laser beam passing through the diffraction grating formed on the transparent flat plate and a 1st order laser beam diffracted by the diffraction grating are used as the first and second slit beams 71 and 72, respectively.

The shape of pattern light outputted by the slit beam projection unit 20 is not restricted to a thin line extremely narrowed in a direction orthogonal to its longitudinal direction. Various types of pattern light, such as a stripe-like beam pattern having a certain width, can be used.

The positional relationship between the first and second slit beams 71 and 72 may be inverted, that is, the optical elements in the slit beam projection unit 20 may be arranged so that the second slit beam 72 will be formed in the first direction (below the first slit beam 71 when viewed from the image capturing device 1) and the first slit will be formed in the second direction.

While the image capturing device 1 is configured to capture the slit-beamed image and the slit-beamless image by use of the imaging lens 31 and the CCD image sensor 32, the image capturing device may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated. Therefore, deviation in the imaging range of the slit-beamless image from that of the slit-beamed image can be eliminated and the three-dimensional shape of the subject can be detected more precisely. However, compared to this example provided with the extra imaging lens and CCD image sensor for capturing the slit-beamed image, the image capturing device of the above embodiment is capable of realizing a reduced size, price, and number of components.

In an embodiment of the present invention, the three-dimensional shape detecting device may further include storage means which stores the image data of the pattern light non-projection image obtained by the image data obtaining means and the three-dimensional shape data figured out by the three-dimensional shape calculation means, and the image data of the pattern light non-projection image and the three-dimensional shape data may be supplied to the external calculating device via the storage means.

With the above configuration, storage capacity can be saved in the three-dimensional shape detecting device compared to cases where both the image data of the pattern light projection image and the image data of the pattern light non-projection image are stored.

In accordance with an embodiment of the present invention, the storage means may be configured to be detachably attached to the three-dimensional shape detecting device, and the external calculating device may include a storage medium interface to which the storage means can be attached detachably. In this case the image data of the pattern light non-projection image and the three-dimensional shape data are supplied to the external calculating device by detaching the storage means, in which the image data of the pattern light non-projection image and the three-dimensional shape data have been stored by the three-dimensional shape detecting device, from the three-dimensional shape detecting device and attaching the storage means to the storage medium interface of the external calculating device.

In accordance with an embodiment of the present invention, the image data of the pattern light non-projection image and the three-dimensional shape data may be stored in a single file in the storage means.

With the above configuration in which the image data of the pattern light non-projection image and the three-dimensional shape data are stored in a single file, data handling can be simplified compared to cases where the image data of the pattern light non-projection image and the three-dimensional shape data are stored in separate files.

In an embodiment of the present invention, the three-dimensional shape detecting device may include a first interface for executing data communication with the external calculating device, and the external calculating device may include a second interface for executing data communication with the three-dimensional shape detecting device. In this case, the image data of the pattern light non-projection image and the three-dimensional shape data may be supplied from the three-dimensional shape detecting device to the external calculating device by wired or wireless data communication via the first interface and the second interface.

With the above configuration, the image data of the pattern light non-projection image and the three-dimensional shape data are transferred from the three-dimensional shape detecting device to the external calculating device. Therefore, the time necessary for data transfer to the external calculating device can be shortened compared to cases where both the pattern light non-projection image and the pattern light projection image are transferred to the external calculating device, by which the reduction of data transfer time can be realized.

In an embodiment of the present invention, the three-dimensional shape calculation means may be configured to figures out position information, lean information and curvature information on the subject in three-dimensional space based on the position of the pattern light extracted by the pattern light position extraction means. In this case, the three-dimensional shape data includes the position information, the lean information and the curvature information on the subject in the three-dimensional space.

Since the three-dimensional shape data includes the position information, the lean information and the curvature information on the subject in the three-dimensional space, the three-dimensional shape of the subject can be determined successfully.

In an embodiment of the present invention, the three-dimensional shape detecting device may be configured as an image capturing device including image capturing means, and the external calculating device may be configured as a personal computer.

In an embodiment of the present invention, the three-dimensional shape detecting device may further comprise storage means which stores the image data of the pattern light non-projection image obtained by the image data obtaining means and the three-dimensional shape data figured out by the three-dimensional shape calculation means. In this case, the storage means is used for supplying the image data of the pattern light non-projection image and the three-dimensional shape data to the external calculating device.

In an embodiment of the present invention, the three-dimensional shape detecting device may further comprise an interface for executing data communication with the external calculating device. In this case, the image data of the pattern light non-projection image and the three-dimensional shape data are supplied to the external calculating device by wired or wireless data communication via the interface.

What is claimed is:

1. A three-dimensional shape detecting system comprising a three-dimensional shape detecting device and an external calculating device, wherein:
    the three-dimensional shape detecting device includes:
        a projector which projects pattern light onto a subject;
        an image data obtaining unit which captures a pattern light projection image of the subject on which the pattern light is projected by the projector and thereby obtains image data of the pattern light projection image, while capturing a pattern light non-projection image of the subject on which the pattern light is not projected and thereby obtaining image data of the pattern light non-projection image;
        a pattern light position extraction unit which extracts a position of the pattern light projected on the subject based on the obtained image data; and
        a three-dimensional shape calculation unit which figures out three-dimensional shape data of the subject based on the position of the pattern light extracted by the pattern light position extraction unit, and
    the external calculating device includes an image correction unit which corrects the pattern light non-projection image into a plane image in which the subject is observed from a direction substantially orthogonal to a prescribed surface of the subject based on the image data of the pattern light non-projection image and the three-dimensional shape data obtained by the three-dimensional shape detecting device.

2. The three-dimensional shape detecting system according to claim 1, wherein:
    the three-dimensional shape detecting device further includes a storage unit which stores the image data of the pattern light non-projection image obtained by the image data obtaining unit and the three-dimensional shape data figured out by the three-dimensional shape calculation unit, and
    the image data of the pattern light non-projection image and the three-dimensional shape data are supplied to the external calculating device via the storage unit.

3. The three-dimensional shape detecting system according to claim 2, wherein:
    the storage unit is configured to be detachably attached to the three-dimensional shape detecting device, and
    the external calculating device includes a storage medium interface to which the storage unit can be attached detachably, and
    the image data of the pattern light non-projection image and the three-dimensional shape data are supplied to the external calculating device by detaching the storage unit, in which the image data of the pattern light non-projection image and the three-dimensional shape data have been stored by the three-dimensional shape detecting device, from the three-dimensional shape detecting device and attaching the storage unit to the storage medium interface of the external calculating device.

4. The three-dimensional shape detecting system according to claim 2, wherein the image data of the pattern light non-projection image and the three-dimensional shape data are stored in a single file in the storage unit.

5. The three-dimensional shape detecting system according to claim 1, wherein:
    the three-dimensional shape detecting device includes a first interface for executing data communication with the external calculating device, and
    the external calculating device includes a second interface for executing data communication with the three-dimensional shape detecting device, and
    the image data of the pattern light non-projection image and the three-dimensional shape data are supplied from the three-dimensional shape detecting device to the external calculating device by wired or wireless data communication via the first interface and the second interface.

6. The three-dimensional shape detecting system according to claim 1, wherein:
    the three-dimensional shape calculation unit figures out position information, lean information and curvature information on the subject in three-dimensional space based on the position of the pattern light extracted by the pattern light position extraction unit, and
    the three-dimensional shape data includes the position information, the lean information and the curvature information on the subject in the three-dimensional space.

7. The three-dimensional shape detecting system according to claim 1, wherein:
    the three-dimensional shape detecting device is configured as an image capturing device including an image capturing unit, and
    the external calculating device is configured as a personal computer.

8. A three-dimensional shape detecting device which is used in a three-dimensional shape detecting system, comprising:
    a projector which projects pattern light onto a subject;
    an image data obtaining unit which captures a pattern light projection image of the subject on which the pattern light is projected by the projector and thereby obtains image data of the pattern light projection image, while capturing a pattern light non-projection image of the subject on which the pattern light is not projected and thereby obtaining image data of the pattern light non-projection image;

a pattern light position extraction unit which extracts a position of the pattern light projected on the subject based on the obtained image data; and a three-dimensional shape calculation unit which figures out three-dimensional shape data of the subject based on the position of the pattern light extracted by the pattern light position extraction unit, wherein:

the image data of the pattern light non-projection image obtained by the image data obtaining unit and the three-dimensional shape data figured out by the three-dimensional shape calculation unit are used by an external calculating device for correcting the pattern light non-projection image into a plane image in which the subject is observed from a direction substantially orthogonal to a prescribed surface of the subject based on the image data of the pattern light non-projection image and the three-dimensional shape data.

9. The three-dimensional shape detecting device according to claim 8, further comprising a storage unit which stores the image data of the pattern light non-projection image obtained by the image data obtaining unit and the three-dimensional shape data figured out by the three-dimensional shape calculation unit, wherein:

the storage unit is used for supplying the image data of the pattern light non-projection image and the three-dimensional shape data to the external calculating device.

10. The three-dimensional shape detecting device according to claim 8, further comprising an interface for executing data communication with the external calculating device, wherein:

the image data of the pattern light non-projection image and the three-dimensional shape data are supplied to the external calculating device by wired or wireless data communication via the interface.

11. A computer readable medium containing instructions for detecting a three-dimensional shape of a subject, the instructions causing a computer to execute:

an image data obtaining step of obtaining image data of a pattern light projection image of a subject on which pattern light is projected and image data of a pattern light non-projection image of the subject on which the pattern light is not projected;

a pattern light position extraction step of extracting a position of the pattern light projected on the subject based on the image data obtained in the image data obtaining step;

a three-dimensional shape calculation step of figuring out three-dimensional shape data of the subject based on the position of the pattern light extracted in the pattern light position extraction step;

a storage step of storing the image data of the pattern light non-projection image and the three-dimensional shape data in a storage unit; and an image correction step of correcting the pattern light non-projection image into a plane image in which the subject is observed from a direction substantially orthogonal to a prescribed surface of the subject based on the image data of the pattern light non-projection image and the three-dimensional shape data stored in the storage unit in the storage step.

12. The computer program product according to claim 11, wherein the image data of the pattern light non-projection image and the three-dimensional shape data are stored in the storage unit in the storage step as one file.

13. A computer readable medium containing instructions for detecting a three-dimensional shape of a subject, the instructions causing a computer to execute:

an image data obtaining step of obtaining image data of a pattern light projection image of a subject on which pattern light is projected and image data of a pattern light non-projecton image of the subject on which the pattern light is not projected;

a pattern light position extraction step of extracting a position of the pattern light projected on the subject based on the image data obtained in the image data obtaining step;

a three-dimensional shape calculation step of figuring out three-dimensional shape data of the subject based on the position of the pattern light extracted in the pattern light position extraction step;

a transmission step of transmitting the image data of the pattern light non-projection image and the three-dimensional shape data to an external calculating device; and an image correction step of receiving the image data of the pattern light non-projection image and the three-dimensional shape data transmitted by the transmission step and correcting the pattern light non-projection image into a plane image in which the subject is observed from a direction substantially orthogonal to a prescribed surface of the subject based on the image data of the pattern light non-projection image and the three-dimensional shape data.

* * * * *